MOTION TRANSMITTING DEVICE

Original Filed May 18, 1956 3 Sheets-Sheet 1

INVENTOR.
RALPH H. WISE

MOTION TRANSMITTING DEVICE

Original Filed May 18, 1956 3 Sheets-Sheet 2

INVENTOR.
RALPH H. WISE

MOTION TRANSMITTING DEVICE

Original Filed May 18, 1956 3 Sheets-Sheet 3

*INVENTOR.*
RALPH H. WISE

United States Patent Office

Re. 25,166
Reissued May 8, 1962

25,166

MOTION TRANSMITTING DEVICE

Ralph H. Wise, Dyersburg, Tenn., by The Anderson Company, Gary, Ind., assignee

Original No. 2,966,071, dated Dec. 27, 1960, Ser. No. 585,651, May 18, 1956. Application for reissue Nov. 15, 1961, Ser. No. 155,229
26 Claims. (Cl. 74—424.8)

Matter enclosed in heavy brackets [ ] appears in the original patent but forms no part of this reissue specification; matter printed in italics indicates the additions made by reissue.

The present invention relates to a nut assembly and, more particularly, to a nut assembly for engaging a threaded member to provide a motion-transmitting device.

The nut assembly of the present invention is of the type embodying bearing elements which are carried in the assembly and rotatably engage the thread of a member or shaft during relative movement between the assembly and shaft. The instant nut assembly is characterized by its ease of manufacture and simplicity of parts. Races are entirely eliminated, and the rotatable elements directly seat against the nut enclosure.

In one form the present invention includes tubular nut means which telescopically receives a threaded shaft. The nut means has axially spaced shoulder portions or abutment surfaces which are disposed radially of the shaft. Elongate rotatable elements fit within the annular area between the nut means and the shaft and have a pair of radially enlarged bearing surfaces to engage simultaneously both the nut means and the shaft. More particularly, these bearing surfaces engage the shoulder portions of the nut means to limit relative axial movement between the nut means and the rotatable elements and also interfit between the running helical thread of the shaft to engage a side of the thread. A cage interposed between the nut means and the shaft has openings to receive the rotatable elements and space them peripherally about the shaft. Rotating or longitudinally moving either the nut means or the shaft produces longitudinal or rotational movement, respectively, in the other.

In the preferred form, the radially enlarged bearing surfaces have an outer portion of toroidal shape to make substantially a point-to-point contact with the thread of the shaft, and the nut means has flange portions or the like by which the motion of the nut means is transmitted to another part removed from the shaft or through which motion is imparted to the nut means. Also to facilitate further the manufacture and/or assembly of the present invention, the cage may be formed from separate component parts as hereinafter described.

The accompanying drawings illustrate a presently preferred embodiment and modifications wherein.

The invention is disclosed as one cooperating member of a combination of driving and driven members in which a helically threaded shaft constitutes the other member. Either member may be the driving member. Further, the driving member may itself be actuated by rotary motion to impart translatory motion to the driven member; or the driving member may be thrust in a linear direction by translatory motion to impart rotary motion to the driven member.

Figure 1:
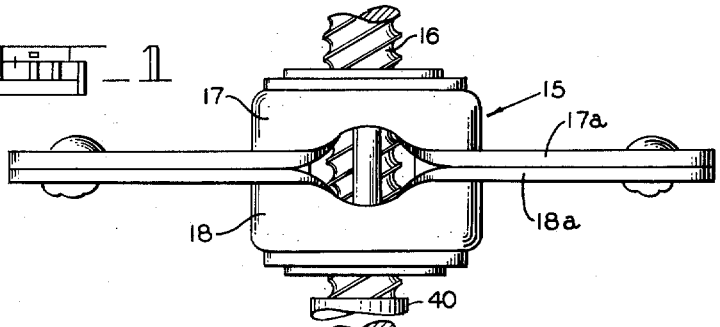
FIGURE 1 is a side view of a motion-transmitting device embodying the present nut assembly and a threaded shaft.
Figure 2:
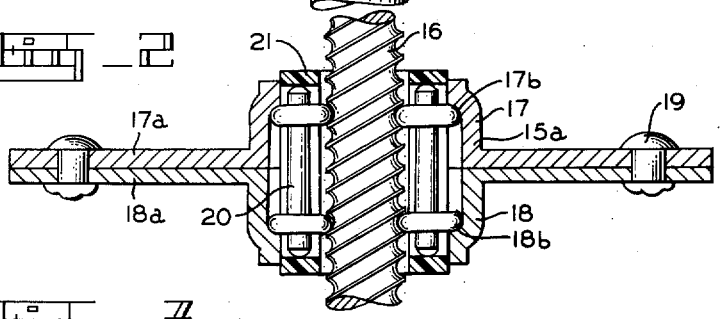
FIGURE 2 is a longitudinal section of FIGURE 1.
Figure 3:
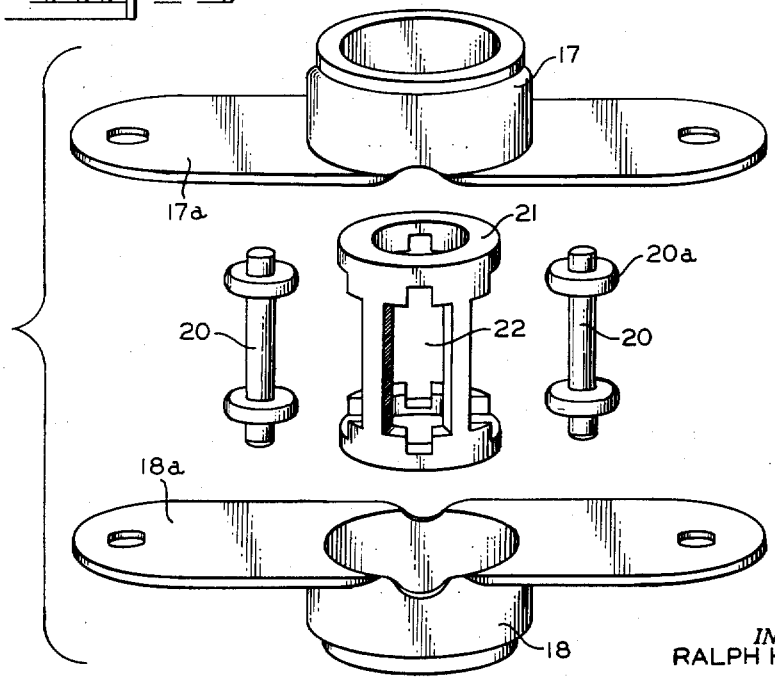
FIGURE 3 is an exploded perspective view of the parts of FIGURE 1 with two rotatable elements removed for purposes of illustration.

In the embodiment illustrated in FIGURES 1, 2, and 3, a nut assembly generally indicated at 15 telescopically receives a threaded shaft 16 for relative rotational and longitudinal movement. The nut assembly comprises an enclosure or mounting means 15a defined by a pair of tubes or collars 17 and 18 which have abutting flange portions 17a and 18a, respectively, at adjacent ends. Rivets 19 secure the flange portions together. The free ends of the collars are of reduced diameter or turned inwardly to form shoulder or abutting surfaces 17b and 18b within the collars. The shoulders are substantially radially disposed with respect to the shaft 16. Each of the collars 17 and 18 is similar to the other and may be easily made by a stamping operation.

Rotatable bearing elements are interposed between the mounting means 15a and the shaft 16 to adapt these members for relative rotational and longitudinal movement and to transfer or transmit a load or force from the mounting means to the shaft or vice versa. Preferably, elongate bearing elements 20 are used and disposed axially of the mounting means and shaft to stabilize these parts relatively to each other. Each element 20 has radially enlarged bearing surfaces 20a which serve a dual function. These surfaces are spaced axially of each rotatable element 20 a distance substantially equal to the axial distance between the abutting surfaces 17b and 18b, so that the elements 20 neatly nest within the area of largest diameter of the mounting means. Since the abutting surfaces or shoulders 17b and 18b are angularly disposed relative to the longitudinal axis of the shaft 16, the radially enlarged surfaces 20a thrust-engage the shoulders in an axial direction to limit relative axial movement between the mounting means 15a and the rotatable elements 20 with respect to the shaft 16. Additionally, the radially enlarged surfaces 20a engage a thread of the shaft 16 at spaced-apart points as shown in FIGURE 2 and, more particularly, make a rolling engagement with a side of the thread to effect the relative rotational and longitudinal movement between the nut assembly 15 and the shaft 16.

A tubular cage member or carrier 21 fits between the mounting means and shaft and has openings 22 to house the rotatable elements 20 and thereby retain them in a spaced relation about the periphery of shaft 16. The cage member also maintains the longitudinal axes of the rotatable elements and the shaft in a desired relation, usually a parallel relation. The openings 22 are of a size to rotatably receive the elements 20 and as shown in FIGURE 3 may be of a general cruciform shape. The outside diameter of the cage member 21 is substantially equal to the inside diameters of the collars 17 and 18 at their inwardly turned ends, so that the cage member 21 makes a sliding fit with the collars at these points to provide a substantially rattle-free assembly.

In the preferred form, the radially enlarged bearing surfaces 20a have an exterior of generally toroidal shape. A toroidal bearing surface is preferred since it has been found to provide a highly desirable substantially point-to-point engagement with a thread of a shaft.

In the embodiment illustrated in FIGURES 1, 2 and 3, the cage member 21 has openings to accommodate four rotatable elements 20, although more or less of these elements may be employed. In the same manner, shaft 16 is multi-threaded and specifically contains four distinct threads. A multithreaded shaft is desirable to provide relatively fast axial travel of the nut assembly 15 when, for example, the shaft 16 is rotated. In this manner, the bearing surfaces 20a of an element may each follow a different thread. One feature of the present structure is that one bearing element may be provided for each thread thus permitting the enlarged bearing surfaces to be aligned and to transfer their lead to a common abutting surface such as 17b or 18b formed in the collars 17 and 18, respectively. Thus, the collars may be formed easily and by relatively inexpensive metal stamping operations. A greater or smaller number of the threads and corresponding bearing elements may be used in any given structure. Three bearing elements and threads may be desirable for stability of the unit. Fewer elements may be used while still retaining sufficient stability and obviously more threads and elements will provide stability.

In the embodiment just described, the cage member or retainer 21 is integral. Because of its tubular nature the cage is more expensive to produce on a mass production basis, particularly by die casting, and requires more expensive tools than if the cage could be manufactured in two or more nontubular parts. This problem is especially accentuated by the presence of the openings 22, since in casting such a part as the cage member 21 suitable means must be employed to blank off the areas which are to form the openings 22. Additionally, openings cast in this manner may not have the precise dimensions needed to accurately mount the rotatable elements as described. Accordingly, in order further to facilitate economic and accurate manufacture of the present nut assembly as well as to facilitate the subsequent assembling of the parts, a split cage or retainer, that is, one comprising two or more parts, is employed. FIGURES 4 through 10 illustrate some of the forms such a cage member may take.

Figure 4:
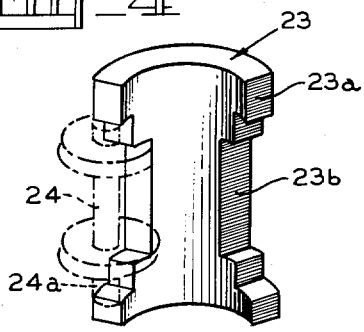
FIGURE 4 is a perspective view of one part of a modified tubular cage or retainer that may be used in the embodiment of FIGURES 1 through 3, a rotatable element being shown in phantom to illustrate the manner in which it is mounted in the cage.

FIGURE 4 shows one arcuate part 23 of three like parts which may have their longitudinal edges 23a placed in abutting relation with each other or in substantial circumferential alignment to define a cage member. Contiguous portions of the abutting edges 23a are recessed as at 23b to cooperate in defining an opening which receives a rotatable element 24 shown in phantom. In the embodiment of FIGURE 4, the recess 23b of each part provides approximately one-half of the entire opening in which the element 24 is carried for rotation. Thus, the pintle ends 24a of the element may be centered within the opening on a line defining the separation of two adjoining parts. In this regard, the cage member 21 of FIGURES 1, 2, and 3 may be considered as being split longitudinally through at least two of the openings 22 to provide a multipiece cage of the type exemplified by part 23 of FIGURE 4. Such a multipiece cage can be made to accommodate a varying number of rotatable elements 24. Moreover, in manufacturing the cage only one distinct part need be made since each part is identical with the other. This is also true of all of the embodiments hereinafter described except that of FIGURE 7.

In use, since the shoulders or abutment surfaces 17b and 18b prevent relative axial movement of the mounting and its rotatable elements, the latter in turn prevent relative axial movement of the component parts of a split cage or retainer. Additionally, since the parts like part 23 preferably make a sliding contact with the inwardly turned ends of the collar members 17 and 18, there is little, if any, movement of the split parts radially of the shaft 16.

Figure 5:
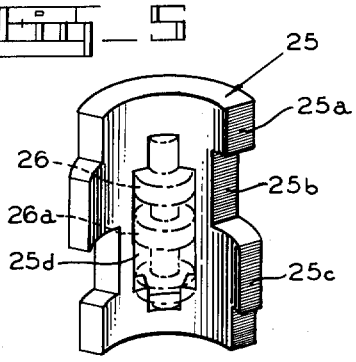
FIGURE 5 is a perspective view of one part of another form of cage or retainer in which the part has means to interfit with a companion part.

However, it may be desirable further to limit any tendency of the parts of a split cage to move axially of each other or to provide a predetermined order of assembly. In such cases, the embodiments of FIGURES 5 through 10 may be used. In FIGURE 5, a part 25 curved transversely has interfitting means along its longitudinal edges 25a to mate with similar means of a companion part, two or more of such parts cooperating to define the cage member. Each of the longitudinal edges 25a has a recess 25b and a lug 25c to interfit with a corresponding lug and recess, respectively, of a companion part and prevent relative axial movement of part 25 and its companion part or parts. To permit each part of a cage member of this type to be of the same construction and interfit as defined with other like parts, lug and recess means may be positioned along both edges of each part in reverse order axially of the part and in circumferential alignment with an opposite interfitting means as illustrated in FIGURE 5. An opening 25d is placed between the longitudinal edges 25a to receive a rotatable element 26. The element 26 illustrates that additional bearing surfaces such as surface 26a, preferably toroidal, may be used. Such a surface is suitably placed axially of the element to engage a thread of the shaft 16 as desired.

Figure 6:
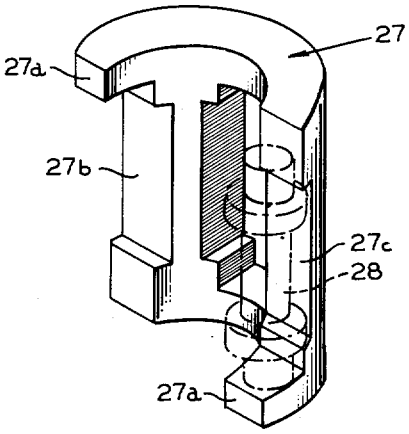
FIGURE 6 is an isometric view of a part of a still further form of cage in which the part has a lip or projection on which to seat an end of a rotatable element.

FIGURE 6 is also representative of a multipiece or split cage in which the cleavage is taken longitudinally of the cage and through openings thereof to form parts like the part 27. Each end of this part has a lip portion or circumferentially extending projection 27a at opposite sides thereof which extends past the plane of cleavage through the openings 27b and 27c and on which an end of a rotatable element 28 may seat. The dimensions of the part 27 and element 28 are such that the projections 27a are spaced axially of the part 27 a distance substantially equal to the length of the element 28. Accordingly, since the shoulder portions 17b and 18b limit relative axial movement of the rotatable elements as previously described, the rotatable element 28 by striking its ends against a portion of each of the adjoining parts like part 27 serves to prevent their relative axial movement as well.

Figure 7:
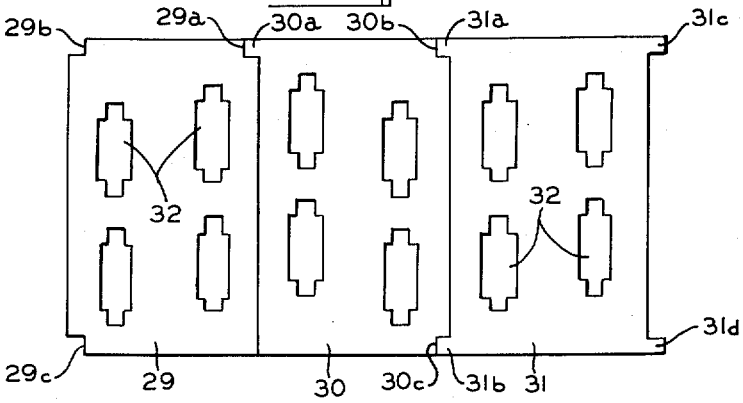
FIGURE 7 is a developed view of the lateral surface of still another form of tubular cage in which the parts have such interfitting means along their longitudinal edges that the parts must be assembled in a predetermined order.

The number of rotatable elements used is not critical to the invention and in some instances, where heavier loads or greater forces are involved, the nut assembly may be of increased diameter and axial extent and employ a larger number of such elements. FIGURE 7 depicts a development of the lateral surface of such a cage member having abutting parts 29, 30, and 31. It will be understood that these parts are actually transversely curved and cooperate to define a cage member in the fashion of previously described embodiments. Because of the greater number of rotatable elements employed, the openings 32 in these parts which house these elements must bear a certain predetermined spacial relation to each other in order to position the rotatable elements at a proper station axially of the shaft 16 and to engage suitably the radially enlarged bearing surfaces of such elements with the thread of the shaft. In the embodiment of FIGURE 7, the longitudinal edges of the parts 29, 30, and 31 have interfitting means, but these edges are promiscuously provided with such means, each edge of a part being designed to mate only with one other edge of a companion part to permit the parts to be quickly assembled in a predetermined order in which the relative spacial arrangement of the openings 32 is the one desired. In this manner, it is not necessary to study the parts or test a trial assembly of a large nut assembly not having such interfitting means to determine if it is the correct order of assembly.

More particularly, the right-hand edge of part 29 as viewed in FIGURE 7 has a single recess 29a, and the left-hand edge of part 30 has a single projection 30a such that these two edges of parts 29 and 30 can receive each other and no other edge. In a like manner, the right-hand edge of part 30, as viewed in FIGURE 7, has a pair of recesses 30b and 30c, and the left-hand edge of part 31 has a pair of projections 31a and 31b to effect the union of these edges; and to complete the circumferential alignment of the parts, the right-hand edge of part 31 also has a pair of projections 31c and 31d to engage aligned recesses 29b and 29c, respectively, along the left-hand edge of part 29. Thus, the three parts 29, 30, and 31 can be quickly and only assembled in the order illustrated.

The cage member may also comprise tubular members suitably secured together in endwise fashion. In this regard, a cage member 21 may be considered as being split transversely through the openings 22. This type of split cage member also has the advantage found in the embodiment of FIGURE 4 in that recesses are exposed at one end or side of the part and may be formed directly by the die itself. Accordingly, the use of auxiliary means to block off areas remote from an end or side of the part to be cast and where an opening is desired is entirely eliminated. Thus, in FIGURES 8, 9 and 10 a tubular part 33 has recesses 33a directly formed at one end. These recesses are axially aligned with adjoining recesses of another like part to define an opening for reception of a rotatable element 34. A nut enclosure 35 having abutment surfaces 35a telescopically receives the cage member and rotatable elements as before.

Suitable means secure the part 33 to a like part 36 in endwise fashion. In the embodiment shown, each part has passages 33b between the recesses 33a in their adjoining ends. Locking pins 37 provided with radial projections 37a have their opposite ends inserted in the passages 33b to fix one part relatively to the other.

In one form, the parts like part 33 are composed of a a flowable plastic material such as a polyamide like nylon. This plastic has the property of "cold flow" under pressure. In the present structure, advantage is taken of this by making the passages 33b of smaller diameter than the maximum diameter of the locking pins 37. Two parts like part 33 may be mounted on a mandrel, and after the pins 37 are centered in place the parts may be forced together so that the opposite ends of the pins 37 are imbedded in the passages 33b to hold the parts together. As the pins 37 enter the undersized passages 33b, the projections 37a "scrub" the flowable plastic material to a size suitable to receive the pins. After flow has ceased, a seal is effected between the pins 37 and the plastic forming a part like part 33.

A motion-transmitting device of the present invention has many applications. For one, the shaft 16 may be journaled at opposite ends and the flange portions 17a and 18a of the nut assembly 15 attached to a window of a vehicle in a manner illustrated and described in my Patent No. 2,714,005. As the shaft rotates in one direction or the other, the nut assembly travels up or down the shaft to regulate the position of the window. During rotation of the shaft 16, the rotatable elements such as the elements 20 rotate in the openings 22 of the cage member 21 on their own axes while making rolling engagement with the thread of the shaft. The difference between the rate of planetation of the elements about the shaft and the rate of rotation of the shaft offers a mechanical advantage in the transmission of the motion.

Figure 8:
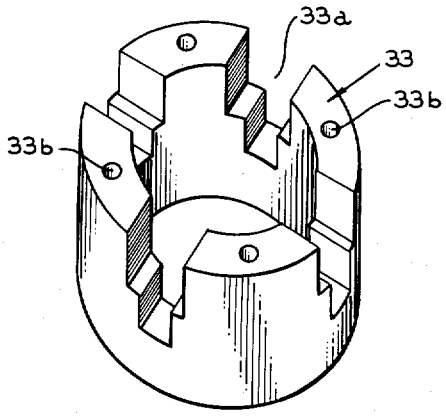
FIGURE 8 is an isometric view of one part of a further form of cage in which the cage is split or divided in a transverse direction.
Figure 10:
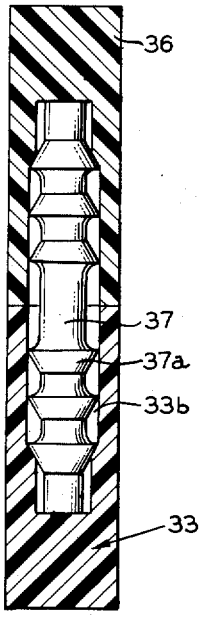
FIGURE 10 is a section of FIGURE 9 on the line X—X.
Figure 9:
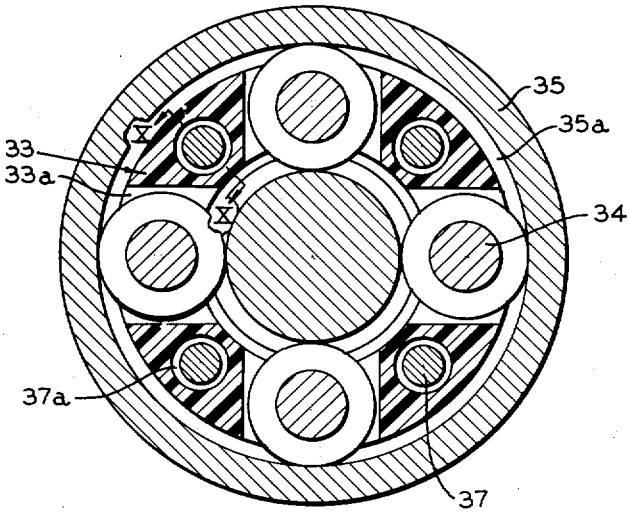
FIGURE 9 is a transverse section of a motion-transmitting device embodying the cage of FIGURE 8 and a threaded shaft.

Another advantage of the present structure is its ability to "free-wheel" when the cage strikes a stop or abutment 40. The structure of FIGURE 1, whether constructed with a cage split longitudinally as in FIGURES 4 to 6 or split radially as depicted in FIGURE 8, will permit the outer parts 17 and 18 of the nut assembly to continue rotation when the cage is stopped from further longitudinal movement along the threaded shaft. Should the threaded shaft be driven, the cage may strike a stop so that longitudinal movement of it and the outer part of the nut assembly will be halted and the shaft continue to rotate on its axis. In the latter instance, the cage will rotate with the shaft.

Although the foregoing disclosure describes a presently preferred embodiment and modifications thereof, it is understood that the invention may be practiced in still other forms within the scope of the following claims.

I claim:

1. A nut assembly for engaging a helically threaded member including a housing member adapted to telescope the threaded member and having portions of reduced diameter to define spaced abutment means within said housing member, elongate rotatable elements interposed between and extending axially of said members and having radially enlarged bearing surfaces, said surfaces being stationed axially of each bearing element a distance substantially equal to the axial distance between the abutment means to engage a bearing surface against each of the abutment means and limit relative axial movement between the housing member and the rotatable elements, said bearing surfaces of each element substantially simultaneously engaging the thread of said threaded member to accommodate relative rotational and longitudinal movement between the two members, and a cage member interposed between the housing member and threaded member and encasing the rotatable elements to maintain them in spaced-apart relation.

2. A nut assembly for engaging a threaded member including a mounting adapted to be disposed about the member and having end portions of reduced diameter to form shoulder portions spaced along the axis of said member, rotatable elements within the mounting having radially enlarged bearing surfaces, each of said surfaces substantially simultaneously engaging a shoulder portion and the thread of the member, and means to space the rotatable elements peripherally of the threaded member.

3. A nut assembly for engaging a helically threaded member including a tubular member adapted to receive the threaded member, said tubular member having inwardly turned ends to define abutment surfaces disposed radially of the threaded member, elongate rotatable elements interposed between the two members and having axially spaced radially enlarged bearing surfaces, each of said bearing surfaces substantially simultaneously engaging the thread of said threaded member and an abutment surface to permit relative rotary movement between the tubular and threaded members and to permit individual and relative axial movement of the tubular member and rotatable elements with respect to the threaded member, and means to hold the rotatable elements apart.

4. A nut assembly for engaging a helically threaded member including a tubular member adapted to telescope the threaded member and having end portions of reduced diameter to define spaced abutment means within said tubular member, elongate rotatable elements interposed between and extending axially of said members and having radially enlarged bearing surfaces, said surfaces being stationed axially of each bearing element a distance substantially equal to the axial distance between the abutment means to engage a bearing surface against each of the abutment means and prevent relative axial movement between the tubular member and the rotatable elements, said bearing surfaces of each element substantially simultaneously engaging the thread of said threaded member to accommodate relative rotational and longitudinal movement between the two members, and a cage member interposed between the tubular and threaded members and housing the rotatable elements to maintain them in a spaced-apart relation.

5. A nut assembly as claimed in claim 4 wherein the cage member has an exposed end portion about the threaded member for abutting a stop permitting relative rotation between the threaded member and tubular member without relative longitudinal movement therebetween.

6. A nut assembly as claimed in claim 4 wherein the cage member is tubular and has openings to receive the rotatable elements, said member being split longitudinally through at least two openings to provide a multipiece cage member adapted for easy assembly.

7. A nut assembly as claimed in claim 4 wherein the cage member is tubular and has openings to receive the rotatable elements, said member being split longitudinally through at least two openings to provide a multipart cage member and facilitate manufacture and assembly of the assembly, each end of each split part having a lip portion at opposite sides thereof on which an end of a rotatable element may seat.

8. A nut assembly as claimed in claim 4 wherein the cage member is tubular and comprises a plurality of arcuate parts adapted to have their longitudinal edges placed in abutting relation with the edges of companion parts, contiguous areas of the abutting edges of the parts being recessed to define an opening for reception of a rotatable element, each end of each arcuate part having a circumferentially extending projection at opposite sides thereof on which an end of a rotatable element may seat and serve to limit relative axial movement between adjoining arcuate parts of the cage member.

9. A nut assembly as claimed in claim 4 wherein the cage member is tubular and comprises a plurality of arcuate parts having their longitudinal edges in substantial circumferential alignment, contiguous portions of adjoining edges of the parts being recessed to define an opening for reception of a rotatable element.

10. A nut assembly as claimed in claim 4 wherein the cage member is tubular and split longitudinally into a plurality of parts, each part having an opening between its longitudinal edges to receive a rotatable element and being provided with interfitting means along its edges to mate with similar means of a companion part.

11. A nut assembly as claimed in claim 4 wherein the cage member is tubular and split longitudinally into a plurality of parts, each part having an opening between its longitudinal edges to receive a rotatable element, each of the longitudinal edges having lug and recess means to interfit with corresponding recess and lug means, respectively, of a companion part and prevent relative axial movement of the parts of the cage member.

12. A nut assembly as claimed in claim 4 wherein the cage member is tubular and comprises a plurality of arcuate parts having their longitudinal edges abutting against one another to define the cage member, each part having an opening between its longitudinal edges to receive a rotatable element, each of the longitudinal edges having lug and recess means to interfit with corresponding recess and lug means, respectively, of a companion part and prevent relative axial movement of the parts of the cage member, the lug and recess means of each part being positioned along the opposite edges thereof in reverse order to permit each part of the cage member to be of the same construction and interfit as defined with other like parts.

13. A nut assembly as claimed in claim 4 wherein the cage member is tubular and comprises a plurality of parts curved transversely and adapted to have their longitudinal edges disposed in close relationship to define the tubular cage member, each part having an opening between its longitudinal edges to receive a rotatable element, the edges of the parts being promiscuously provided with notches and projections, each edge of a part being designed to mate only with one other edge of a companion part to permit the parts to be assembled to form the cage member in a predetermined order.

14. A nut assembly as claimed in claim 4 wherein the cage member is tubular and has openings to receive the rotatable elements, said member being split transversely, and further including means to secure the split parts endwise.

15. A nut assembly as claimed in claim 4 wherein the cage member is tubular and has openings to receive the rotatable elements, said member being split transversely through the openings into parts, and further including lock means stationed between the openings to secure the parts together with the openings of each part contiguous and in substantial alignment.

16. A nut assembly as claimed in claim 4 wherein the cage member comprises two tubular members stationed end to end, contiguous areas of the adjacent ends being recessed to define an opening for reception of a rotatable element, and pins adapted to have their ends imbedded in the two tubular members to fix said members relatively to each other.

17. A nut assembly as claimed in claim 4 wherein the cage member comprises two tubes positioned endwise and composed of a flowable plastic material, adjacent areas of the adjoining ends being notched to cooperate in defining an opening for reception of a rotatable element, passages in the adjacent ends of the tubes between the notches, and pins having their opposite ends imbedded in the passages to secure the tubes together, said pins having radial projections thereon to cause those portions of the plastic material contacted to flow and admit the pins into said passages and thereafter effect a seal from the tube to the pin.

18. A nut assembly for engaging a helically threaded shaft including a mounting to telescopically receive the shaft and means to adapt the mounting and shaft for relative rotational and linear movement, said mounting including a pair of collar members having abutting flange portions and means to secure the flange portions together, said flange portions serving to transmit the motion of the mounting, the free end of each collar member being turned inwardly to form an abutment surface within the collar member, said adapting means including a plurality of elongate rotatable elements stationed between the collar members and the shaft and extending along the shaft, each rotatable element having radially enlarged bearing surfaces spaced axially of the element to engage both abutment surfaces and limit individual axial movement between the collar members and the rotatable elements, said bearing surfaces also serving to transmit motion from the shaft to the mounting and vice versa by making rolling engagement with a side of the thread of the shaft, and a carrier interposed between the collar members and the shaft having openings to receive the rotatable elements and space them peripherally about the shaft.

19. A motion-transmitting device including driving and driven members, one member including a helically threaded shaft and the other member including a mounting telescopically receiving the shaft, said mounting comprising a tubular nut member having inwardly turned ends to define internal shoulder portions disposed substantially radially of the shaft, a plurality of elongate rotatable elements spaced between the nut member and the shaft and having radially enlarged toroidal bearing surfaces, said surfaces contacting the shoulder portions to limit relative axial movement between the nut member and the rotatable elements, said surfaces also making a rolling engagement with a side of the thread of the shaft to planetate thereabout on their own axes, retainer means interposed between the nut member and the shaft and housing the rotatable elements to maintain them in a spaced relation, and means to operatively connect the mounting to an element designed to have a like motion and stationed apart from the driving and driven members whereby rotational and longitudinal movement of the shaft produce, respectively, longitudinal and rotational movement of the mounting, and vice versa.

20. A device for converting rotary motion to longitudinal motion and vice versa comprising driving and driven members, one member having a helical thread, the other member being disposed about said one member and comprising tubular nut means having internal abutment surfaces disposed angularly to the longitudinal axis of the threaded member, means to adapt the driving and driven members for relative rotational and linear movement including a plurality of elongate elements interposed between the members and disposed axially thereof to stabilize the members with respect to each other, said elongate elements having radially enlarged toroidal bearing surfaces to make substantially a point-to-point contact with the thread of the threaded member and to thrust-engage the abutment surfaces to prevent individual movement of the nut member and rotatable elements relatively to the threaded member, a tubular cage stationed between the driving and driven members and making a sliding fit against the tubular nut means, said cage rotatably carrying the elongate elements and spacing them peripherally about the threaded member, and flange means on the exterior of the nut means to transmit the motion thereof to a point removed from said device whereby rotation of the threaded member produces linear movement of said other member and vice versa.

21. A nut assembly for engaging a threaded member including a mounting having stamped metal mating parts providing shoulder portions spaced axially of each other, and rotatable elements within the mounting having radially enlarged bearing surfaces engaging said shoulder portions and adapted to engage said threaded member for providing a driving connection between the assembly and threaded member.

*22. A nut assembly for engaging a helically threaded member including a housing member adapted to telescope the threaded member and having portions of reduced diameter to define spaced abutment means within said housing member, elongate rotatable elements interposed between and extending axially of said members and having radially enlarged bearing surfaces, said surfaces being stationed axially of each bearing element a distance substantially equal to the axial distance between the abutment means to engage a bearing surface against each of the abutment means and limit relative axial movement between the housing member and the rotatable elements, said bearing surfaces of each element substantially simultaneously engaging the thread of said threaded member to accommodate relative rotational and longitudinal movement between the two members.*

*23. A nut assembly for engaging a helically threaded member including a tubular member adapted to telescope the threaded member and having end portions of reduced diameter to define spaced abutment means within said tubular member, elongate rotatable elements interposed between and extending axially of said members and having radially enlarged bearing surfaces, said surfaces being stationed axially of each bearing element a distance substantially equal to the axial distance between the abutment means to engage a bearing surface against each of the abutment means and prevent relative axial movement between the tubular member and the rotatable elements, said bearing surfaces of each element substantially simultaneously engaging the thread of said threaded member to accommodate relative rotational and longitudinal movement between the two members.*

*24. A nut assembly for engaging a threaded member including a mounting adapted to be disposed about the member and having portions of reduced diameter to form shoulder portions spaced along the axis of said member, elongate rotatable elements within the mounting having radially enlarged spaced-apart bearing surfaces, each of said surfaces substantially simultaneously engaging a shoulder portion and the thread of the member, the rotatable elements retained peripherally about the threaded member.*

*25. A nut assembly for engaging a helically threaded member including a tubular member adapted to receive the threaded member, said tubular member having inwardly turned ends to define abutment surfaces disposed radially of the threaded member, elongate rotatable elements interposed between the two members and having axially spaced radially enlarged bearing surfaces, the bearing surfaces substantially simultaneously engaging threads of said threaded member and abutment surfaces to permit relative rotary movement between the tubular and threaded members and to permit individual and relative axial movement of the tubular member and rotatable elements with respect to the threaded member.*

*26. A nut assembly for engaging a helically threaded member including a mounting disposed about and coaxial with the threaded member, said mounting having an internal portion provided with axially spaced-apart shoulders defining raceways, elongate rotatable elements peripherally spaced about the threaded element between the threaded member and the mounting, said elements having spaced-apart radially enlarged portions defining bearing surfaces simultaneously contacting the raceways and threads of the threaded member thereby establishing a driving contact between the mounting and the threaded member for relative rotational and axial movement therebetween.*

References Cited in the file of this patent or the original patent

UNITED STATES PATENTS

| | | |
|---|---|---|
| 1,974,781 | Marles | Sept. 25, 1934 |
| 2,446,393 | Russell | Aug. 3, 1948 |
| 2,683,379 | Strandgren | July 13, 1954 |

FOREIGN PATENTS

| | | |
|---|---|---|
| 692,431 | France | Nov. 5, 1930 |